United States Patent
Tokatyan

(10) Patent No.: US 10,304,165 B2
(45) Date of Patent: May 28, 2019

(54) VEHICLE STAIN AND TRASH DETECTION SYSTEMS AND METHODS

(71) Applicant: Ford Global Technologies, LLC, Dearborn, MI (US)

(72) Inventor: Shant Tokatyan, Foster City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 61 days.

(21) Appl. No.: 15/593,880

(22) Filed: May 12, 2017

(65) Prior Publication Data

US 2018/0330475 A1 Nov. 15, 2018

(51) Int. Cl.
G06K 9/62 (2006.01)
G06T 5/00 (2006.01)
G06K 9/00 (2006.01)

(52) U.S. Cl.
CPC .......... *G06T 5/002* (2013.01); *G06K 9/00832* (2013.01); *G06K 9/6267* (2013.01); *G06T 2207/10052* (2013.01)

(58) Field of Classification Search
CPC .................................. G06K 9/00832–9/00845
See application file for complete search history.

(56) References Cited

U.S. PATENT DOCUMENTS

| | | |
|---|---|---|
| 6,005,958 A | 12/1999 | Farmer |
| 6,781,676 B2 | 8/2004 | Wallace |
| 7,027,621 B1 | 4/2006 | Preokosi |
| 7,262,696 B2 | 8/2007 | Aota |
| 8,098,302 B2 | 1/2012 | Fukuda |
| 8,416,397 B2 | 4/2013 | Balzer |
| 9,128,185 B2 | 9/2015 | Zeng |
| 9,444,770 B1 | 9/2016 | Ledet |
| 9,488,982 B2 | 11/2016 | Gurin |
| 9,760,827 B1 | 9/2017 | Lin |
| 2004/0245467 A1 | 12/2004 | Lannestedt |

(Continued)

FOREIGN PATENT DOCUMENTS

| | | |
|---|---|---|
| CN | 202422205 U | 9/2012 |
| CN | 202448860 U | 9/2012 |

(Continued)

OTHER PUBLICATIONS

Zhenpeng Ge et al., "Semi-automatic recognition of marine debris on beaches", Scientific Reports, www.nature.com/scientific reports, published May 9, 2016, pp. 1-9. (Year: 2016).*

(Continued)

*Primary Examiner* — Brian Werner
(74) *Attorney, Agent, or Firm* — David R. Stevens; Stevens Law Group

(57) ABSTRACT

Example vehicle stain and trash detection systems and methods are described. In one implementation, a method receives a clean image and clean Lidar data associated with a clean vehicle interior. The method also receives a second image and second Lidar data associated with the vehicle interior after a passenger has occupied the vehicle. Differences are identified between the clean image and the second image. Additionally, differences are identified between the clean Lidar data and the second Lidar data. The method determines whether the vehicle interior includes at least one of a stain, dirt, or trash based on the identified differences.

17 Claims, 8 Drawing Sheets

(56) References Cited

U.S. PATENT DOCUMENTS

| | | |
|---|---|---|
| 2005/0024494 A1 | 2/2005 | Hirota |
| 2005/0131625 A1 | 6/2005 | Birger |
| 2005/0276464 A1* | 12/2005 | Duquette .................. G06K 9/00 382/151 |
| 2006/0091310 A1 | 5/2006 | Furry |
| 2008/0036580 A1 | 2/2008 | Breed |
| 2009/0039255 A1 | 2/2009 | Andrews |
| 2009/0040778 A1 | 2/2009 | Takayanagi |
| 2009/0208083 A1* | 8/2009 | Hayes .................. G01R 33/543 382/131 |
| 2013/0010096 A1 | 1/2013 | Chidanand |
| 2014/0160434 A1 | 6/2014 | Brown |
| 2014/0163329 A1 | 6/2014 | Brown |
| 2015/0213299 A1 | 7/2015 | Ferrandez |
| 2015/0323388 A1 | 11/2015 | Kostic |
| 2016/0078576 A1 | 3/2016 | Su |
| 2016/0328976 A1 | 11/2016 | Jo |
| 2016/0332535 A1* | 11/2016 | Bradley ................. B60N 2/002 |
| 2017/0091559 A1 | 3/2017 | Hurtado |
| 2017/0136842 A1 | 5/2017 | Anderson |
| 2017/0174180 A1 | 6/2017 | Hoyos |
| 2017/0210352 A1 | 7/2017 | Stauffer |
| 2017/0267251 A1 | 9/2017 | Roberts |
| 2017/0291548 A1 | 10/2017 | Kim |
| 2017/0330044 A1 | 11/2017 | Telpaz |
| 2017/0353681 A1* | 12/2017 | Mochizuki ............... G06K 9/38 |
| 2018/0022358 A1 | 1/2018 | Fung |

FOREIGN PATENT DOCUMENTS

| | | |
|---|---|---|
| CN | 202871022 U | 4/2013 |
| CN | 203224912 U | 10/2013 |
| CN | 104597857 A | 5/2015 |
| CN | 104601937 A | 5/2015 |
| DE | 102012007559 A1 | 11/2012 |
| GB | 2543161 | 4/2017 |
| GB | 2558722 | 7/2018 |
| JP | H06273255 A | 9/1994 |
| JP | 2011105415 A | 6/2011 |
| WO | WO-2005001409 A2 | 1/2005 |
| WO | WO 2015/025435 | 2/2015 |

OTHER PUBLICATIONS

2012 FLIR Systems, Inc. Specifications are subject to change without notice, check our website: www.flir.com/Maritime. 1005-398 v.2.

Track Buses in Real Time with SBU Smart Transit, SBU Happenings, Mar. 16, 2012.

* cited by examiner

VEHICLE STAIN AND TRASH DETECTION SYSTEMS AND METHODS

TECHNICAL FIELD

The present disclosure relates to vehicular systems and, more particularly, to systems and methods that detect stains and trash located in a vehicle.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that a passenger requesting the service can enter the vehicle. The vehicle then drives to a destination and allows the passenger to exit the vehicle. Before picking up another passenger, it is preferable that the vehicle interior is clean for the next passenger.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
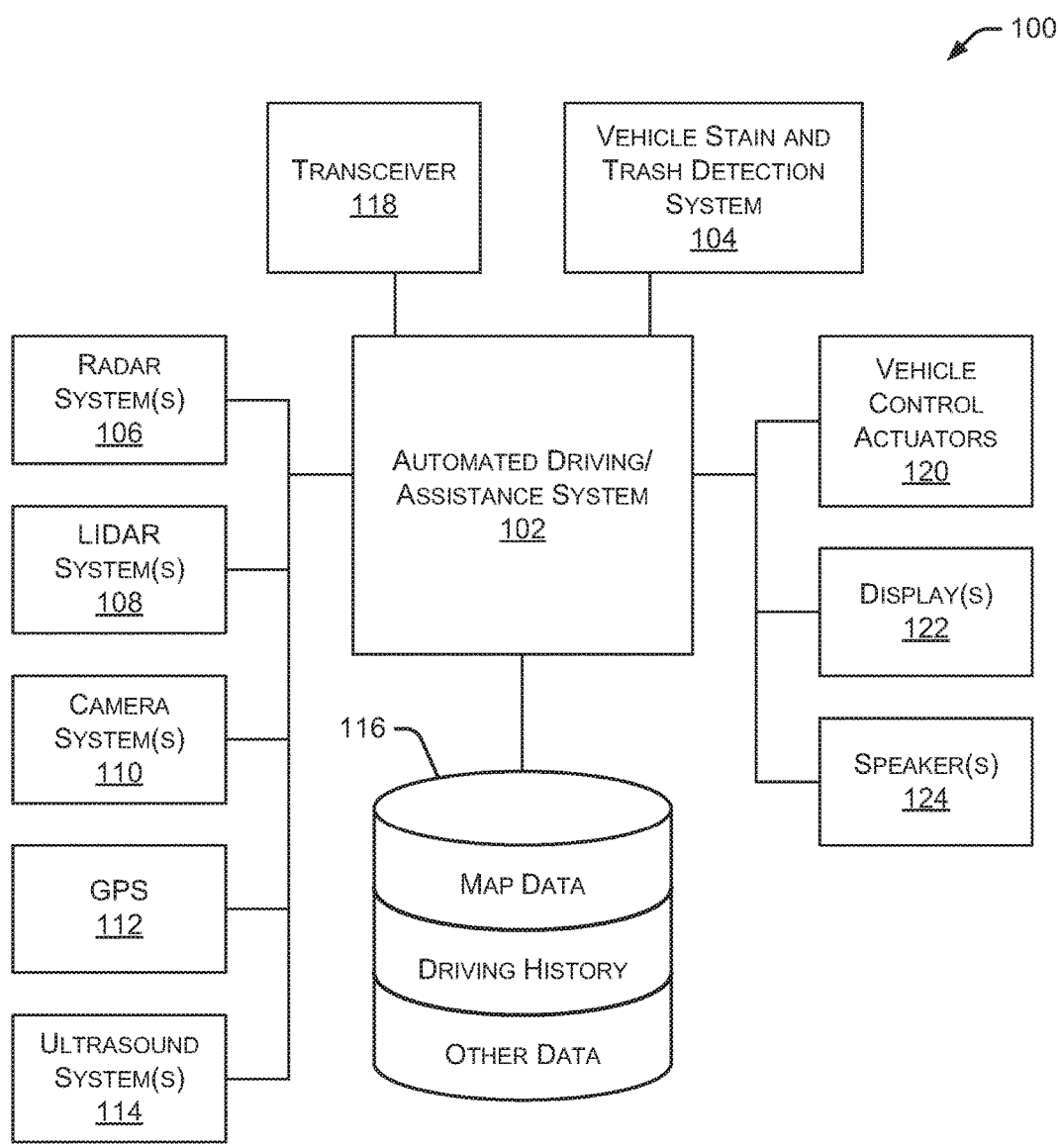
FIG. 1 is a block diagram illustrating an embodiment of a vehicle control system that includes a vehicle stain and trash detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes a vehicle stain and trash detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes vehicle stain and trash detection system 104 that interacts with various components in the vehicle to detect stains, dirt, trash, and other items inside the vehicle. Although vehicle stain and trash detection system 104 is shown as a separate component in FIG. 1, in alternate embodiments, vehicle stain and trash detection system 104 may be incorporated into automated driving/assistance system 102 or any other vehicle component.

Vehicle control system 100 also includes one or more sensor systems/devices for detecting a presence of nearby objects (or obstacles) or determining a location of a parent vehicle (e.g., a vehicle that includes vehicle control system 100). For example, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. For example, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

Figure 2:
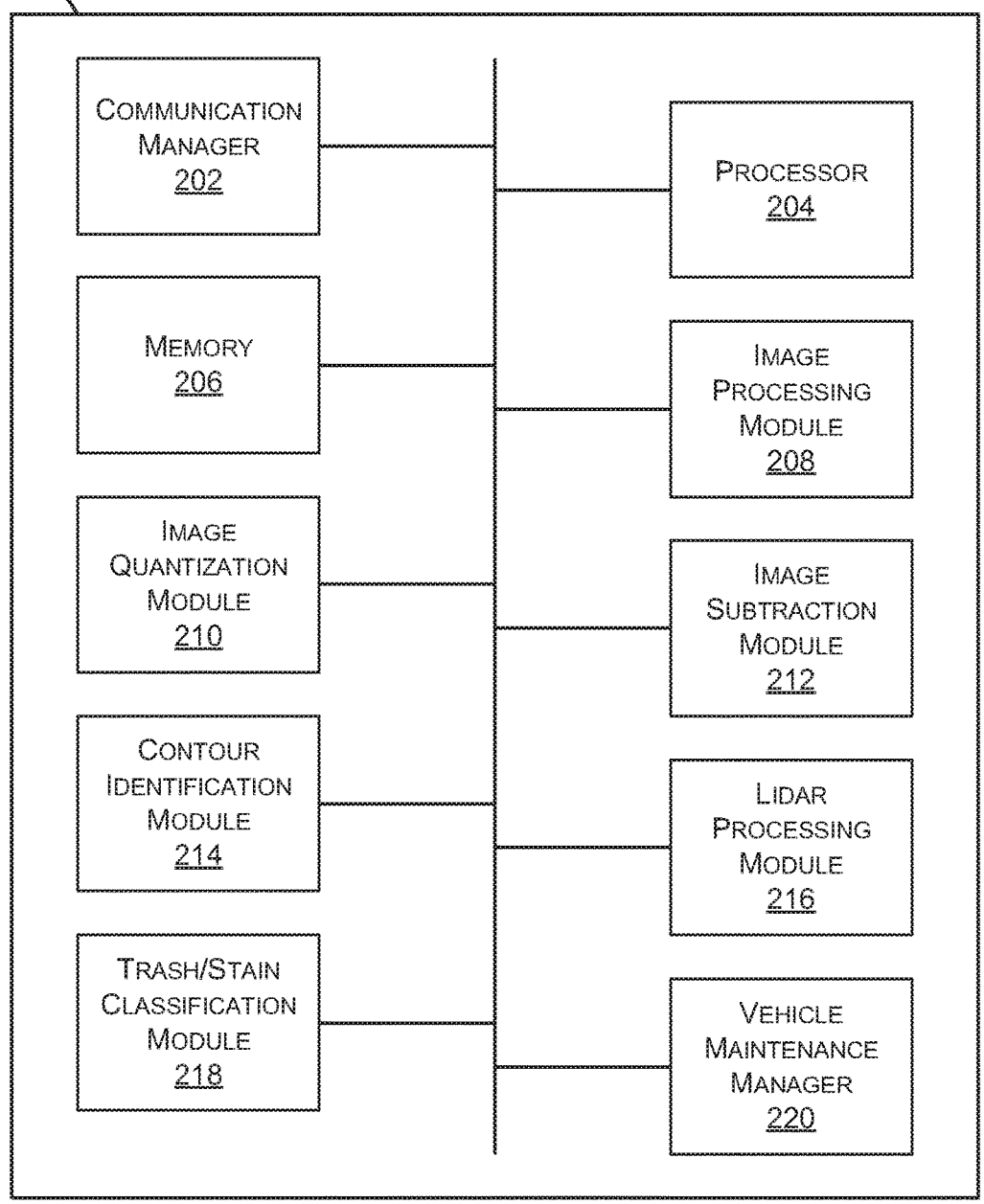
FIG. 2 is a block diagram illustrating an embodiment of a vehicle stain and trash detection system.

FIG. 2 is a block diagram illustrating an embodiment of vehicle stain and trash detection system 104. As shown in FIG. 2, vehicle stain and trash detection system 104 includes a communication manager 202, a processor 204, and a memory 206. Communication manager 202 allows vehicle stain and trash detection system 104 to communicate with other systems, such as automated driving/assistance system 102. Processor 204 executes various instructions to implement the functionality provided by vehicle stain and trash detection system 104, as discussed herein. Memory 206 stores these instructions as well as other data used by processor 204 and other modules and components contained in vehicle stain and trash detection system 104.

Additionally, vehicle stain and trash detection system 104 includes an image processing module 208 that receives image data from one or more camera systems 110. In some embodiments, image processing module 208 includes an image management algorithm or process that manages one or more clean images that represent images of the vehicle interior when it is clean (e.g., no stains, dirt, trash, or other items in the vehicle). Additionally, image processing module 208 may manage one or more additional images that are captured after a passenger has exited the vehicle. As discussed herein, these additional images are compared to the clean images to determine whether the vehicle interior has a stain, trash, dirt, or other item as a result of the passenger traveling in the vehicle.

An image quantization module 210 is capable of quantizing both clean images and additional images to reduce noise in the images. When quantizing the images, the image quantization module 210 reduces the color spectrums of the images to multiple shades of gray (e.g., three shades of gray), which helps to reduce noise in the images. In some embodiments, quantization is also referred to as "n-color gray scaling." For example, image quantization module 210 may implement the techniques disclosed in U.S. application Ser. No. 15/360,856, filed Nov. 23, 2016, and entitled "Detection of lane-splitting motorcycles", which is hereby incorporated herein in its entirety.

Vehicle stain and trash detection system 104 also includes an image subtraction module 212 that subtracts the additional images from the clean images to identify differences between the images. These differences may represent stains, dirt, trash, or other items left behind by the previous passenger. For example, image subtraction module 212 may implement the techniques disclosed in U.S. application Ser. No. 15/360,856, filed Nov. 23, 2016, and entitled "Detection of lane-splitting motorcycles", which is hereby incorporated herein in its entirety.

A contour identification module 214 identifies one or more contours in the differences between the clean images and the additional images, as identified by image subtraction module 212. The contours include, for example, the outline of stains, dirt, pieces of trash, or other items, such as items left behind by the previous passenger. Contour identification module 214 also defines a bounding box around each contour. The bounding box allows a user or computing system to easily locate the identified contours. Additionally, based on the placement and angle of the camera that captured each image, vehicle stain and trash detection system 104 can map the bounding box to a particular location in the vehicle.

A Lidar processing module 216 receives Lidar data from one or more Lidar systems 108, such as one or more Lidar sensors within the vehicle. In some embodiments, Lidar processing module 216 includes a Lidar data management algorithm or process that manages one or more sets of Lidar data that represent the vehicle interior when it is clean (e.g., no stains, dirt, trash, or other items in the vehicle), referred to as "clean Lidar data." Additionally, Lidar processing module 216 may manage one or more additional sets of Lidar data that are captured after a passenger has exited the vehicle. As discussed herein, the additional sets of Lidar data are compared to the clean Lidar data to determine whether the vehicle interior has a stain, trash, dirt, or other item as a result of the passenger traveling in the vehicle A trash/stain classification module 218 detects locations and types of stains, dirt, trash, and other items in the vehicle. For example, trash/stain classification module 218 analyzes the identified contours in the images, which indicate the presence of a new object. Using the image data, the new object is classified by analyzing the shape of the contour as well as the smoothness of the contour edges. For example, if the contour is substantially round with smooth edges, it is likely a stain. Alternatively, if the contour has an irregular shape and/or sharp/jagged edges, it is more likely to be a piece of trash or other item left in the vehicle by the previous passenger. Additionally, trash/stain classification module 218 analyzes the Lidar data to determine an approximate shape and size of any identified objects. As discussed herein, the size and shape of the objects can be determined (or approximated) based in differences in the Lidar point clouds associated with the clean Lidar data and the Lidar data captured after a passenger has exited the vehicle. For example, the image contours can be superimposed on the corresponding Lidar point clouds based on the location data. Using the point cloud data and the image contour at a particular location in the vehicle can assist the systems and methods described herein with classifying the stain, dirt, trash, or other object.

In some embodiments, trash/stain classification module 218 classifies an object or an area defined by a contour as a two-dimensional area or a three-dimensional area. For example, an area defined by a contour (as determined by a comparison of images) is typically two-dimensional, which may indicate a stain or dirt on a vehicle surface (such as a vehicle seating surface). Alternatively, if an object is identified based on comparison of sets of Lidar data, the object is typically three-dimensional, such as a piece of trash or other item left behind by the previous passenger.

In some embodiments, trash/stain classification module 218 accesses a data source (e.g., a database or lookup table) containing information associated with previously classified contours, such as the shape and edge characteristics of each contour and the resulting classification of each contour. Additionally, the data source may contain information associated with previously classified objects, such as the point cloud characteristics of previous Lidar data and the resulting classification of the object. That information associated with previously classified contours or Lidar data may be used by trash/stain classification module 218 to analyze and classify future contours and future Lidar data, such as identifying a previously classified contours or Lidar data in the data source that are a close match to a current contour or Lidar data being classified. A close match allows trash/stain classification module 218 to make assumptions regarding the classification of the contour or Lidar data.

A vehicle maintenance manager 220 manages the cleaning and maintenance of the vehicle. For example, if a stain, dirt, trash, or other item is detected in the vehicle after a passenger has exited the vehicle, vehicle maintenance manager 220 may determine whether the vehicle needs to be removed from service before accepting the next passenger. If cleaning is required, vehicle maintenance manager 220 may instruct automated driving/assistance system 102 to drive the vehicle to the nearest cleaning or service facility. As discussed herein, vehicle maintenance manager 220 may consider the size or shape of the detected stain, dirt, trash, or other item when determining whether cleaning is required. Additionally, if cleaning is required, vehicle maintenance manager 220 may determine what kind of cleaning is necessary.

Figure 3:
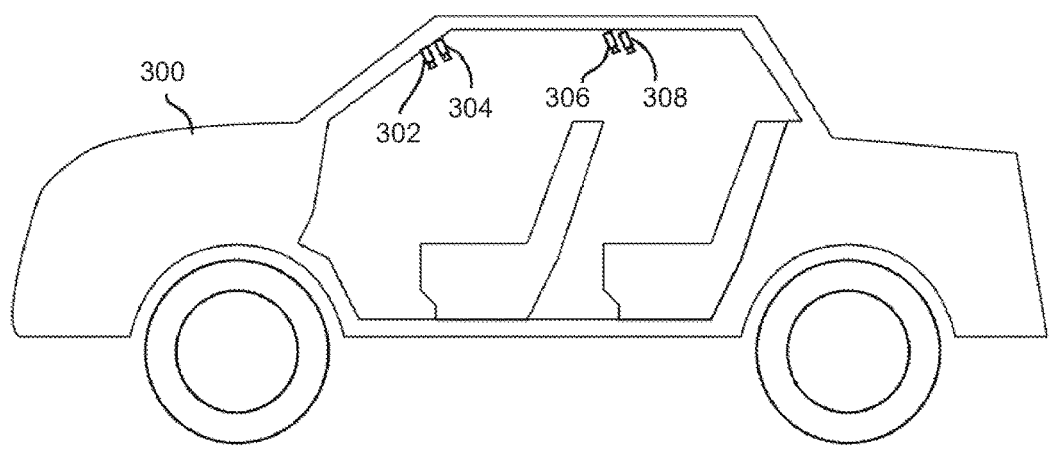
FIG. 3 illustrates an embodiment of a vehicle with multiple interior cameras and multiple interior Lidar sensors.

FIG. 3 illustrates an embodiment of a vehicle 300 with multiple interior cameras and multiple interior Lidar sensors. As shown in FIG. 3, vehicle 300 has two interior cameras 302, 306, and two interior Lidar sensors 304, 308. In some embodiments, cameras 302, 306 are positioned and oriented in vehicle 300 such that all seating surfaces (e.g., seat bottoms and seat backs) are in the field of view of at least one camera 302, 306. Other areas of the interior of vehicle 300 may also be in the field of view of one or more cameras 302, 306. Similarly, Lidar sensors 304, 308 may be positioned and oriented in vehicle 300 such that all seating surfaces (e.g., seat bottoms and seat backs) are sensed by at least one Lidar sensor 304, 308. Other areas of the interior of vehicle 300 may also be sensed by one or more Lidar sensors 304, 308.

In the configuration of vehicle 300, camera 302 is positioned and oriented to capture images of seating surfaces of the front seats of the vehicle. Additionally, camera 306 is positioned and oriented to capture images of seating surfaces of the rear seats of the vehicle. Similarly, Lidar sensor 304 is positioned and oriented to capture data associated with seating surfaces of the front seats of the vehicle. Additionally, Lidar sensor 308 is positioned and oriented to capture data associated with seating surfaces of the rear seats of the vehicle. Although two interior cameras 302, 306 and two Lidar sensors 304, 308 are shown in FIG. 3, in alternate embodiments, vehicle 300 may have any number of interior cameras and any number of interior Lidar sensors positioned in various locations throughout the vehicle and aimed at different angles.

Figure 4A:
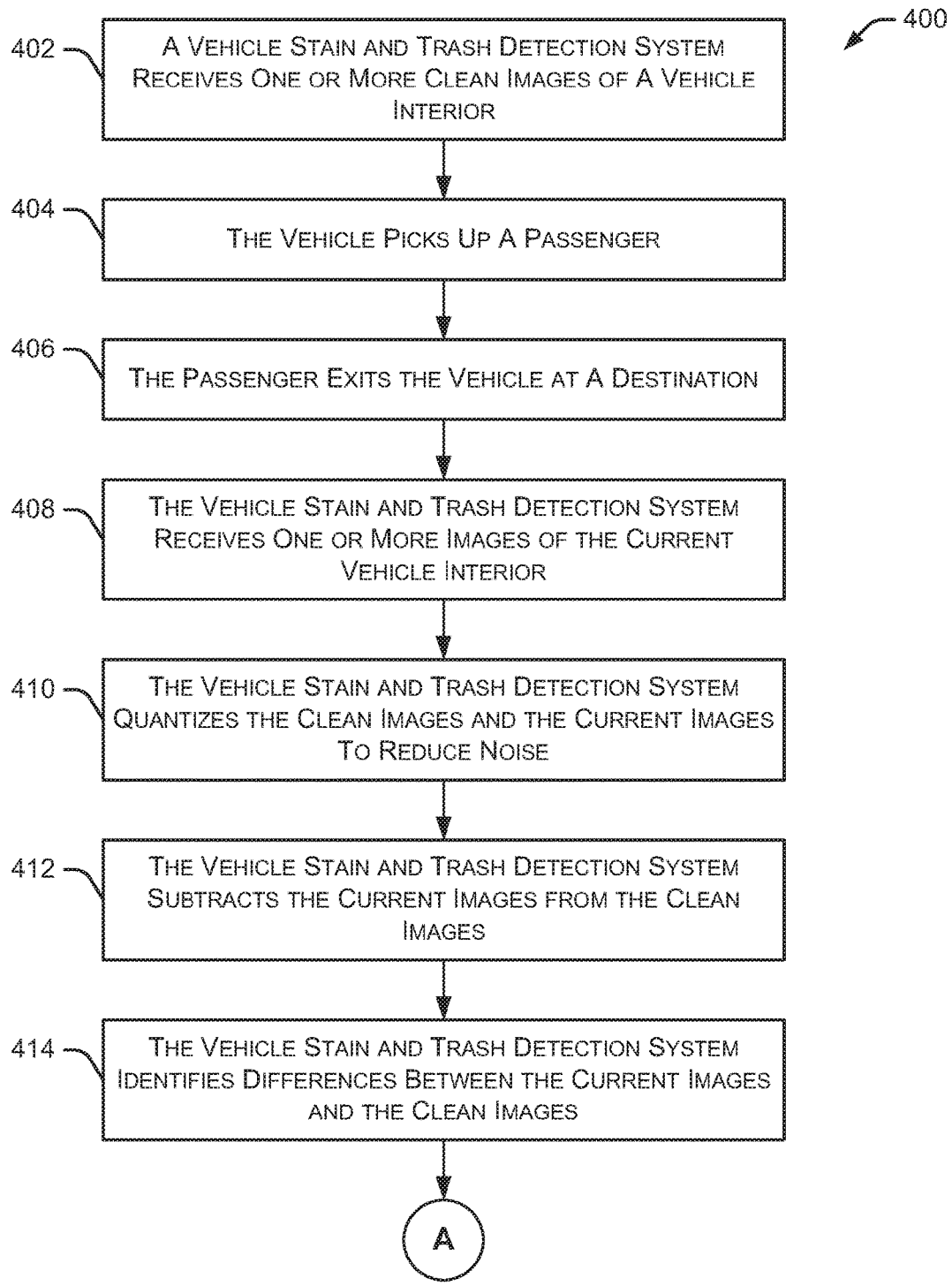
FIGS. 4A-4C illustrate an embodiment of a method for detecting stains and trash in a vehicle.
Figure 4B:
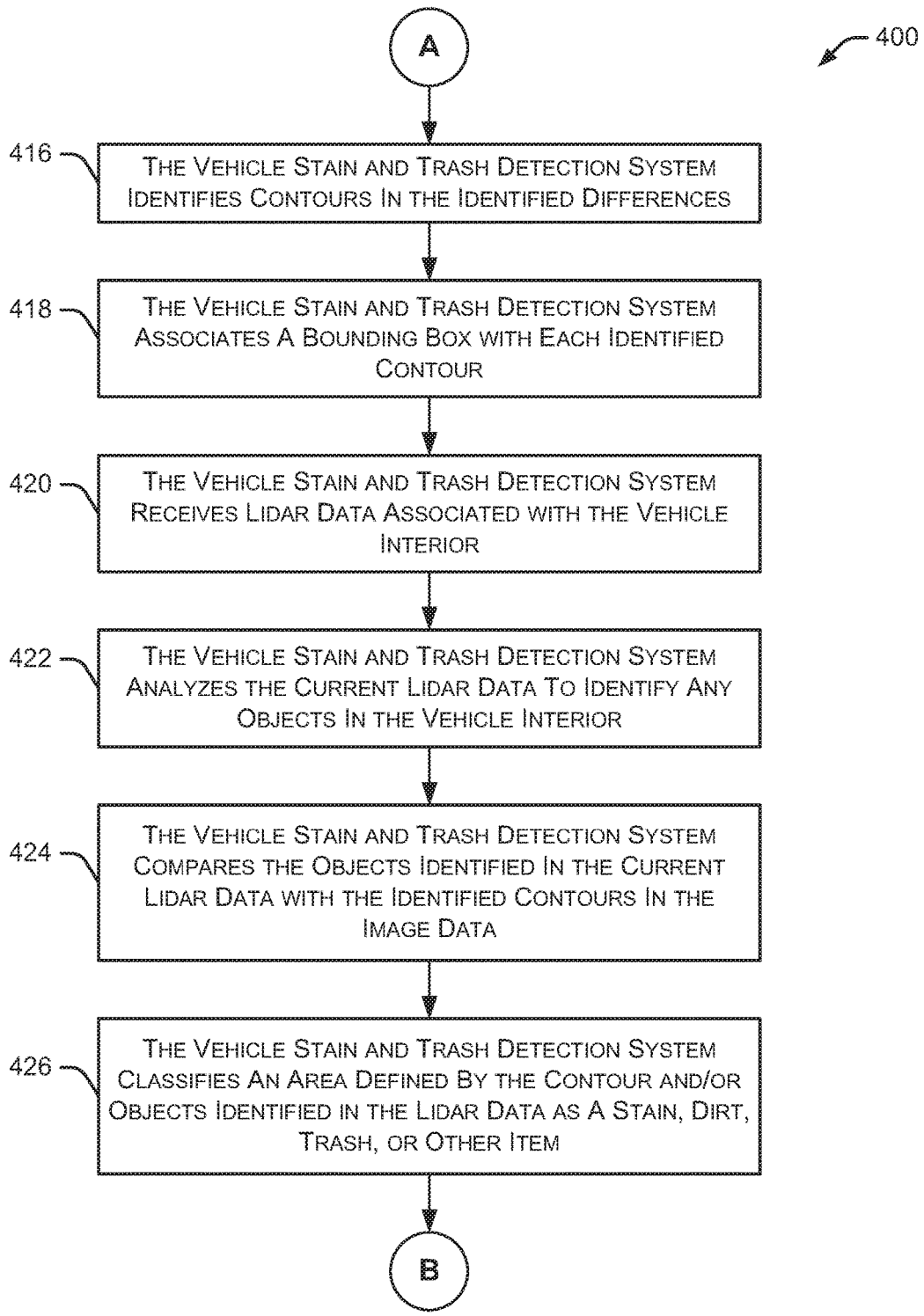
Figure 4C:
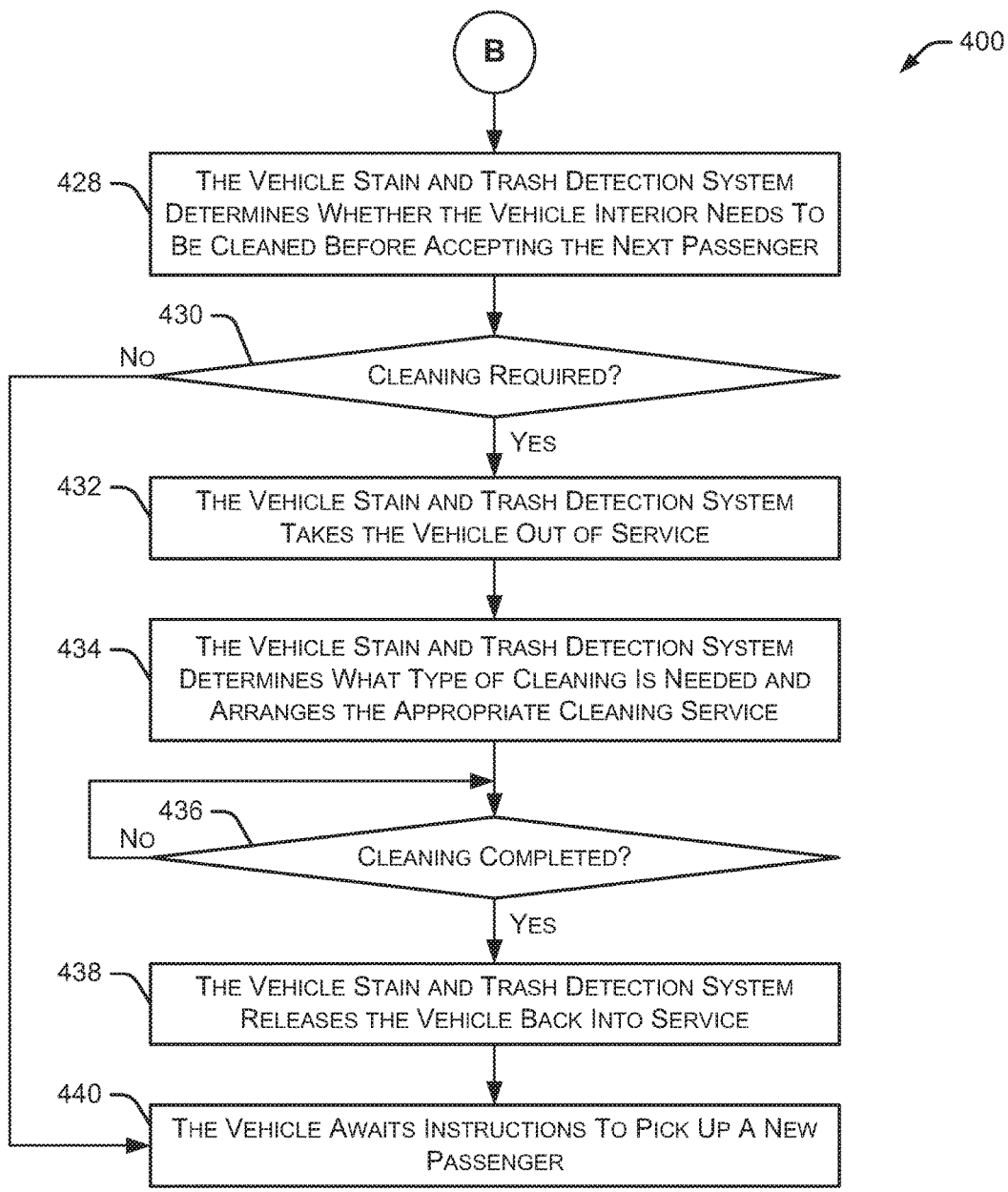

FIGS. 4A-4C illustrate an embodiment of a method 400 for detecting stains and trash in a vehicle. Initially, a vehicle stain and trash detection system receives 402 one or more clean images of a vehicle interior. These clean images may be considered "reference images" and represent a clean vehicle interior. In some embodiments, the vehicle interior should be substantially similar to the clean images before picking up a passenger for transport. In response to a transportation request (or other instruction), the vehicle picks up 404 a passenger and transports the passenger to a destination. The passenger exits 406 the vehicle at the destination.

After the passenger exits 406 the vehicle, the vehicle stain and trash detection system receives 408 one or more images of the current vehicle interior (i.e., "current images"). In some embodiments, the location and position from which the current images are take is substantially similar the location and position from which the clean images were taken. The vehicle stain and trash detection system quantizes 410 the clean images and the current images to reduce noise. Method 400 continues as the vehicle stain and trash detection system subtracts 412 the current images from the clean images. In some embodiments, the vehicle stain and trash detection system subtracts 412 each current image from a corresponding clean image (e.g., clean images of the same portion of the vehicle interior).

The vehicle stain and trash detection system then identifies 414 differences between the current images and the clean images. As discussed herein, these differences may represent stains, dirt, trash, or other items left behind by the previous passenger. The vehicle stain and trash detection system identifies 416 contours in the identified differences. The contours may represent, for example, the outline of stains, dirt, pieces of trash, or other items. In some embodiments, these contours are two-dimensional since they are generated based on two-dimensional images captured by one or more vehicle-mounted cameras.

As method 400 continues, the vehicle stain and trash detection system associates 418 a bounding box with each identified contour. As noted above, the bounding box allows a user or computing system to easily identify the identified contours. And, based on the placement and angle of the camera that captured each image, the vehicle stain and trash detection system can map the bounding box to a particular location in the vehicle. Thus, the bounding box can assist cleaning personnel or self-cleaning systems in locating the specific stains, dirt, pieces of trash, or other items.

The vehicle stain and trash detection system receives 420 Lidar data associated with the vehicle interior after the passenger has exited the vehicle, which may be referred to as "current Lidar data." In some embodiments, the location and position from which the current Lidar data is received is substantially similar the location and position from which the clean Lidar data was received.

Method 400 continues as the vehicle stain and trash detection system analyzes 422 the current Lidar data to identify any objects in the vehicle interior, such as trash, dirt, and other objects. In some embodiments, the current Lidar data represents the identified objects in three dimensions. The vehicle stain and trash detection system then compares 424 the objects identified in the current Lidar data with the identified contours in the image data. For example, the image contours may be superimposed on the Lidar data to better define the boundary (e.g., edges) of an identified object in the Lidar data.

The vehicle stain and trash detection system classifies 426 an area defined by the contour and/or objects identified in the Lidar data as a stain, dirt, trash, or other item. As discussed herein, the area defined by a contour can be classified by analyzing the shape of the contour as well as the smoothness of the contour edges. For example, if the contour is substantially round with smooth edges, it is likely a stain. However, if the contour has an irregular shape and/or has sharp/jagged edges, it is more likely to be a piece of trash or other item left in the vehicle by the previous passenger. As discussed below, one or more objects are identified in the Lidar data based on differences in the point cloud data between a clean set of Lidar data and the current set of Lidar data. As noted above, in some embodiments, trash/stain classification module 218 may access a data source containing information associated with previously classified contours and/or previously classified Lidar data. This additional information is useful to analyze and classify contours, such as identifying a previously classified contour in the data source that is a close match to a current contour being classified. Similarly, the additional information is useful to analyze and classify objects identified in the Lidar data, such as identifying a previously classified Lidar data in the data source that is a close match to a current set of Lidar data being classified.

The vehicle stain and trash detection system determines 428 whether the vehicle interior needs to be cleaned before accepting the next passenger. For example, if the vehicle stain and trash detection system identifies a significant stain or piece of trash left by the previous passenger, the vehicle may need to be cleaned before accepting another passenger. Additionally, if the vehicle needs to be cleaned, the determination 422 may include the type of cleaning needed. For example, a small piece of trash can be easily removed by a robot, an automated cleaning system that includes a vacuum, or an individual user located near the vehicle. However, if a significant stain or a large amount of dirt is detected, the vehicle may require a more thorough cleaning at a vehicle service center or performed by a mobile cleaning service. Additionally if the size or shape of a piece trash cannot be removed using a vacuum or other automated cleaning system, the vehicle may require servicing by an individual user located near the vehicle or at a vehicle service center. If cleaning is not required, the vehicle awaits instructions 440 to pick up a new passenger in response to a new transportation request.

If cleaning is required 430, the vehicle may be taken out of service 432 while a cleaning service is arranged and the vehicle interior cleaning is performed. The vehicle stain and trash detection system determines 434 what type of cleaning is needed and arranges or schedules the appropriate cleaning service for the vehicle. When the vehicle cleaning is completed 436, the vehicle is released back into service 438 and is available to accept new transportation requests. The vehicle then awaits instructions 440 to pick up a new passenger in response to a new transportation request.

Figure 5:
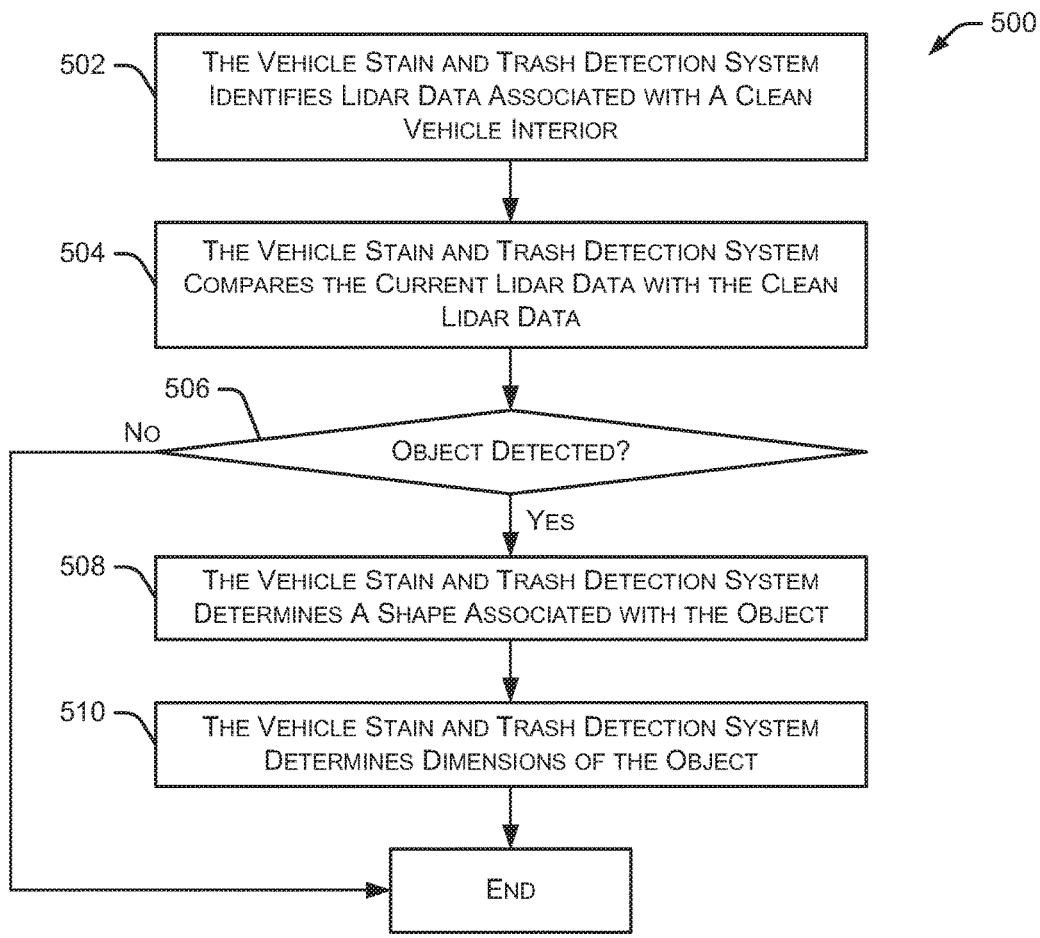
FIG. 5 illustrates an embodiment of a method for identifying an object in a vehicle.

FIG. 5 illustrates an embodiment of a method 500 for identifying an object in a vehicle. At least a portion of method 500 may be performed in the analysis 422 portion of method 400. Initially, the vehicle stain and trash detection system identifies 502 Lidar data associated with a clean vehicle interior (e.g., no dirt, stains, trash, or other objects). This clean Lidar data is used as the reference data when comparing with Lidar data received after a passenger has exited the vehicle.

Method 500 continues as the vehicle stain and trash detection system compares 504 the current Lidar data with the clean Lidar data. Based on the comparison 504, the vehicle stain and trash detection system determines whether an object is detected 506 in the vehicle's interior. If no object is detected, method 500 ends. However, if an object is detected 506, the vehicle stain and trash detection system determines 508 determines a shape associated with the object. Additionally, the vehicle stain and trash detection system determines 510 the dimensions of the object. In some embodiments, the shape and dimensions of the object are approximations based on the comparison of the current Lidar data with the clean Lidar data.

Figure 6A:
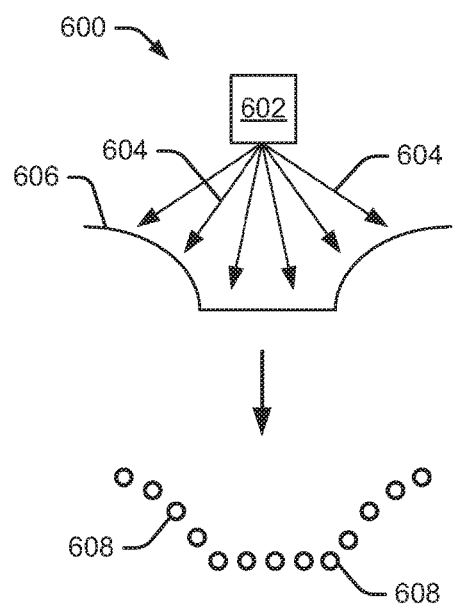
FIGS. 6A-6C illustrate examples of identifying an object in a vehicle using one or more Lidar sensors.
Figure 6B:
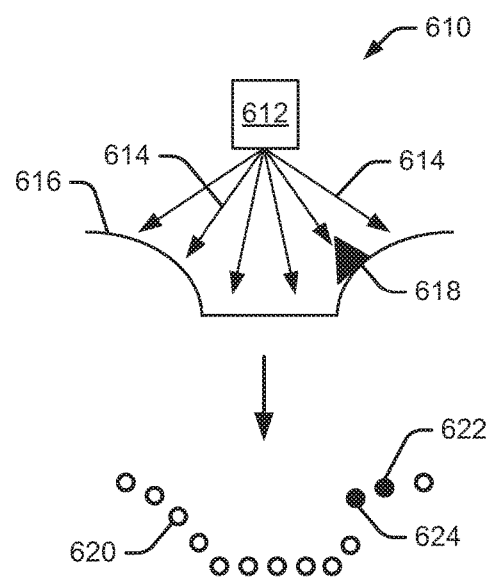
Figure 6C:
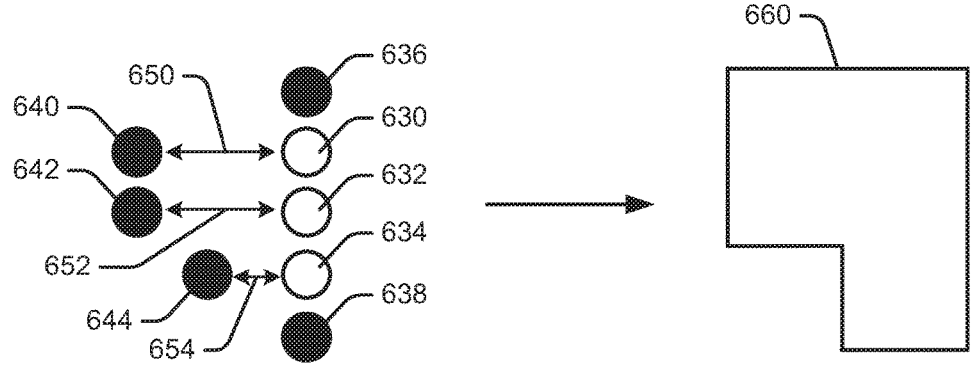

FIGS. 6A-6C illustrate examples of identifying an object in a vehicle using one or more Lidar sensors. Referring to FIG. 6A, an example environment 600 includes a Lidar sensor 602 that generates multiple Lidar beams 604 directed at a surface 606, such as an interior vehicle surface. In some embodiments, surface 606 is a vehicle seating surface, a vehicle door's interior surface, or a vehicle floor surface. The lower portion of FIG. 6A illustrates a point cloud with multiple points 608, which is the result of a Lidar scan performed by Lidar sensor 602. As shown in FIG. 6A, the shape of the point cloud corresponds to the shape of surface 606. In the example of FIG. 6A, there are no stains, dirt, trash, or other objects on surface 606. Thus, the point cloud shown in the lower portion of FIG. 6A may represent "clean" Lidar data.

FIG. 6B illustrates an example environment 610, which includes a Lidar sensor 612 that generates multiple Lidar beams 614 directed at a surface 616, such as an interior vehicle surface. In some embodiments, surface 616 is the same surface as 606. In environment 610, a piece of trash (or other object) 618 is located on surface 616. The lower portion of FIG. 6B illustrates a point cloud with multiple points 620, represented as hollow circles. The multiple hollow points 620 correspond to points 608 in FIG. 6A. Two additional points in the point cloud (622 and 624) are filled circles and represent "misplaced points" that are different from the corresponding points 608 in FIG. 6A (the clean Lidar data). As used herein, "misplaced points" refer to points within the Lidar point cloud that not located where they are supposed to be (or expected to be) if the vehicle's interior is clean. Thus, the misplaced points identify deviations in the point cloud from the clean Lidar data. These deviations may represent trash, dirt, or other objects not present in the clean Lidar data. In some embodiments, these misplaced points represent the difference caused by the piece of trash 618. Based on the shape of the point cloud in FIG. 6B, the vehicle stain and trash detection system can determine an approximate shape and dimensions of the piece of trash 618.

Referring to FIG. 6C, a point cloud representing current Lidar data is shown on the left side of the figure. Points 630, 632, and 634 are hollow circles to represent the "clean" or "expected" points in the point cloud. The remaining points 636, 638, 640, 642, and 644 are filled circles to represent the misplaced points that are different from the corresponding points in the clean Lidar data. Thus, the filled circles 636-644 define the edges of an item not present in the clean Lidar data. The edges define by the points in the point cloud identify a shape (or an approximate shape) of the item. Further, the spacing between points in the point cloud is used to determine dimensions (or approximate dimensions) of the item. For example, lines 650, 652, and 654 represent widths at different portions of the item. Those lines 650, 652, and 654 correspond to the spacing in shape 660 shown on the right side of FIG. 6C.

In some embodiments, the systems and methods discussed herein are also useful in detecting interior vehicle damage, such as torn seats, broken trim pieces, hanging trim pieces, damaged arm rests, and the like.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
  receiving a clean image and clean Lidar data associated with a clean vehicle interior;
  receiving a second image and second Lidar data associated with the vehicle interior after a passenger has occupied the vehicle;
  identifying differences between the clean image and the second image;
  identifying differences between the clean Lidar data and the second Lidar data; and
  determining whether the vehicle interior includes at least one of a stain, dirt, or trash;
  wherein determining whether the vehicle interior includes at least one of a stain, dirt, or trash includes classifying the identified differences as two-dimensional or three-dimensional.

2. The method of claim 1, further comprising quantizing the clean image and the second image to reduce noise.

3. The method of claim 1, further comprising identifying at least one contour in the identified differences between the clean image and the second image.

4. The method of claim 3, further comprising associating a bounding box with the identified contour.

5. The method of claim 1, wherein determining whether the vehicle interior includes at least one of a stain, dirt, or trash is based on at least one of differences between the clean image and the second image, and differences between the clean Lidar data and the second Lidar data.

6. The method of claim 1, wherein identifying differences between the clean image and the second image includes subtracting the second image from the clean image.

7. The method of claim 1, wherein identifying differences between the clean Lidar data and the second Lidar data includes identifying differences in the point clouds of the clean Lidar data and the second Lidar data.

8. The method of claim 1, further comprising classifying two-dimensional differences as stains and classifying three-dimensional differences as at least one of dirt or trash.

9. The method of claim 1, further comprising determining a shape associated with the three-dimensional differences.

10. The method of claim 1, further comprising determining dimensions associated with the three-dimensional differences.

11. The method of claim 1, further comprising determining whether the vehicle interior needs to be cleaned based on determining whether the vehicle interior includes at least one of a stain, dirt, or trash.

12. The method of claim 1, wherein the vehicle is an autonomous vehicle.

13. A method comprising:
- receiving a clean image and clean Lidar data associated with a clean vehicle interior;
- receiving a second image and second Lidar data associated with the vehicle interior after a passenger has occupied the vehicle;
- identifying, by a vehicle stain and trash detection system, differences between the clean image and the second image;
- identifying, by the vehicle stain and trash detection system, differences between the clean Lidar data and the second Lidar data; and
- determining whether the vehicle interior includes at least one of a stain, dirt, or trash based on:
  - the identified differences between the clean image and the second image; and
  - the identified differences between the clean Lidar data and the second Lidar data;
- wherein determining whether the vehicle interior includes at least one of a stain, dirt, or trash further includes classifying the identified differences as two-dimensional or three-dimensional.

14. The method of claim 13, wherein identifying differences between the clean Lidar data and the second Lidar data includes identifying differences in the point clouds of the clean Lidar data and the second Lidar data.

15. The method of claim 13, further comprising classifying two-dimensional differences as stains and classifying three-dimensional differences as at least one of dirt or trash.

16. An apparatus comprising:
- a communication manager configured to receive a clean image and clean Lidar data associated with a clean vehicle interior, and configured to receive a second image and second Lidar data associated with the vehicle interior after a passenger has occupied the vehicle;
- an image processing module configured to identify differences between the clean image and the second image;
- a Lidar processing module configured to identify differences between the clean Lidar data and the second Lidar data; and
- a classification module configured to classify an area within the vehicle as one of a stain, dirt, trash, or another item based on at least one of differences between the clean image and the second image, and differences between the clean Lidar data and the second Lidar data;
- wherein the classification module is further configured to identify the identified stain, dirt, trash, or other item as two-dimensional or three-dimensional.

17. The apparatus of claim 16, wherein identifying differences between the clean Lidar data and the second Lidar data includes identifying differences in the point clouds of the clean Lidar data and the second Lidar data.

\* \* \* \* \*